(12) United States Patent
Rice

(10) Patent No.: US 7,641,474 B2
(45) Date of Patent: Jan. 5, 2010

(54) METHOD AND SYSTEM FOR ARRANGING A PAINT COLOR DISPLAY

(75) Inventor: Mary Rose Rice, Laguna Niguel, CA (US)

(73) Assignee: Behr Process Corporation, Santa Ana, CA (US)

( * ) Notice: Subject to any disclaimer, the term of this patent is extended or adjusted under 35 U.S.C. 154(b) by 0 days.

(21) Appl. No.: 10/748,953

(22) Filed: Dec. 30, 2003

(65) Prior Publication Data

US 2005/0140691 A1    Jun. 30, 2005

(51) Int. Cl.
*G09B 19/00* (2006.01)

(52) U.S. Cl. .................. 434/98; 345/593; 345/595; 434/81; 434/84; 434/103; 283/114; 40/124.2; 40/124.4

(58) Field of Classification Search .............. 345/594, 345/595; 434/103
See application file for complete search history.

(56) References Cited

U.S. PATENT DOCUMENTS

| | | | |
|---|---|---|---|
| 173,408 A | 2/1876 | Leggett | |
| 299,052 A | 5/1884 | Brooks et al. | |
| 371,701 A | 10/1887 | Parker | |
| 376,634 A | 1/1888 | Church | |
| 731,550 A | 6/1903 | Drummond | |
| 750,620 A | 1/1904 | Dohse | |
| 757,549 A | 4/1904 | Gould | |
| 1,175,960 A | 3/1916 | Kroeger | |
| 1,508,988 A | 9/1924 | Ross | |
| 1,629,330 A | 5/1927 | Adler | |
| 2,203,167 A | * 6/1940 | Lodwick | 434/98 |
| 2,234,609 A | 3/1941 | Rowe | |
| 2,300,360 A | * 10/1942 | Remmers | 434/79 |
| 2,354,493 A | 7/1944 | Adams, Jr. | 88/14 |

(Continued)

FOREIGN PATENT DOCUMENTS

EP    0699544    3/1996

(Continued)

OTHER PUBLICATIONS

Microsoft PhotoDraw 2000 (Microsoft Corp. © 1995-1999, version 2.0.0.1229, Screenshots 1-17).*

(Continued)

*Primary Examiner*—Antonio A Caschera
(74) *Attorney, Agent, or Firm*—Greenberg Traurig LLP; Franklin D. Ubell

(57) ABSTRACT

One aspect of the present invention provides a method for systematically arranging paint color samples for convenient browsing and identification of desired colors by shoppers. Paint color sample cards are arranged on a two-dimensional display surface such that colors of similar hue are categorized or grouped together (e.g., along a column). Groups of paint color sample cards having different base hue or color are arranged such that there is a gradual transition between paint colors from one region to the next region. For instance, the colors of sample cards may gradually change from column to column across a two-dimensional display. Additionally, within each color group, paint color sample cards are arranged from most chromatic to least chromatic colors. Another aspect of the invention provides for accent color sample cards to be displayed adjacent to the various base color groups.

32 Claims, 10 Drawing Sheets

U.S. PATENT DOCUMENTS

| | | | | |
|---|---|---|---|---|
| 2,409,285 A | * | 10/1946 | Egbert | 434/98 |
| 2,866,277 A | * | 12/1958 | Wise | 434/98 |
| 3,069,788 A | | 12/1962 | Balinkin | 35/28.3 |
| 3,211,470 A | | 10/1965 | Wilson et al. | 283/18 |
| 3,229,385 A | | 1/1966 | DePauw | 35/28.3 |
| 3,384,983 A | | 5/1968 | Olson | 35/28.5 |
| 3,434,227 A | | 3/1969 | Brown, Jr. | 35/28.3 |
| 3,517,448 A | | 6/1970 | Wallace | 35/28.3 |
| 4,104,809 A | | 8/1978 | Day et al. | 434/104 |
| 4,253,259 A | | 3/1981 | Schaffer et al. | 40/492 |
| 4,665,394 A | | 5/1987 | Coles et al. | 340/815.1 |
| 4,992,050 A | | 2/1991 | Edwards | 434/98 |
| 5,275,566 A | | 1/1994 | Yang | 434/98 |
| 5,282,690 A | | 2/1994 | Moseley | 402/79 |
| 5,312,001 A | * | 5/1994 | Sorensen | 211/50 |
| 5,522,623 A | | 6/1996 | Soules et al. | 283/91 |
| 5,531,482 A | | 7/1996 | Blank | 283/67 |
| 5,855,480 A | | 1/1999 | Housman | 434/75 |
| 6,270,123 B1 | | 8/2001 | Spangler | 283/114 |
| D470,191 S | | 2/2003 | Rice | D20/99 |
| 6,632,093 B1 | | 10/2003 | Rice et al. | 434/98 |
| 6,665,965 B1 | | 12/2003 | Turchi et al. | 40/492 |
| 2002/0092221 A1 | | 7/2002 | DaRif et al. | 40/674 |
| 2003/0091962 A1 | | 5/2003 | Hung | 434/84 |
| 2004/0004639 A1 | * | 1/2004 | Simonis | 345/810 |
| 2004/0004719 A1 | | 1/2004 | Takada et al. | 356/421 |
| 2004/0046802 A1 | * | 3/2004 | Wright et al. | 345/810 |
| 2004/0077471 A1 | | 4/2004 | Verbruggen et al. | 493/162 |

FOREIGN PATENT DOCUMENTS

| | | |
|---|---|---|
| GB | 2283104 | 4/1995 |
| JP | 2002351887 | 12/2002 |
| JP | 2003029642 | 1/2003 |

OTHER PUBLICATIONS

"Painting on Location Lesson—RCW, The Original Real Color Wheel," Jusko, Donald A. http://www.mauigateway.com/~donjusko/rcwmap.htm. Last updated Sep. 14, 2003. Accessed on May 2, 2005.*
PCT/US2004/043367, Dec. 22, 2001, Int. Search Report for corresponding International Application, mailed Dec. 20, 2005.

* cited by examiner

METHOD AND SYSTEM FOR ARRANGING A PAINT COLOR DISPLAY

FIELD OF THE INVENTION

The invention pertains to displays of paint color samples. More particularly, at least one embodiment of the invention relates the systematic arrangement of paint color samples in a convenient-to-search order.

DESCRIPTION OF RELATED ART

When selecting paints, it is often useful to display the paint colors available on color cards. Each card typically provides a color sample for a single paint color. When a large number of different paint colors are available, it becomes a difficult task to organize these cards in a way that is easily accessible to customers. Ideally, the cards should be organized and displayed in such a way that the customer is able to find the desired color(s) with relative ease. Additionally, it would be helpful if the card arrangement could also "suggest" other colors to the customer that would go well with a selected color. Prior art attempts to display paint color samples to consumers have been unsatisfactory in several respects. The present invention overcomes these shortcomings.

SUMMARY

Paint color sample cards are arranged on a two-dimensional display surface such that colors having a similar hue angle, or colors that lie within a hue range, are categorized or grouped together (e.g., along a column) as a family of colors. For example, paint color sample cards having the same base hue or color are arranged on the same display region (e.g., column). Groups of paint color sample cards having different base hues or colors are arranged such that there is a gradual transition between paint colors from one region to the next region. For instance, the colors of sample cards may gradually change from column to column across a two-dimensional display array. Additionally, within each color group or family, paint color sample cards may be arranged from the most chromatic (purest) to the least chromatic colors (shaded). Thus, a customer may conveniently search for a desired color across columns and then search for the desired shade or tint down the rows. Accent color sample cards are preferably displayed adjacent to the various base color groups. For instance, along the region where red-based sample cards are displayed, color cards of white paint colors having a red tint are arranged to provide customers a convenient way to find accent colors.

Combination style cards may be provided within each color family. The combination style cards may include one or more color schemes having one or more colors found in the color family in which the combination style card is placed. That is, the combination style cards are used to provide color scheme ideas to shoppers for some of the colors in the color display. In one embodiment, the combination style card is a tri-fold card including three different color schemes. For each color scheme in the combination style card, a different room, environment, or exterior may be shown in the combination style card. Along each column and row of the color display, a plurality of different combination style cards may be displayed. The combination style cards may be organized such that a user may obtain color scheme ideas for every major room or environment of a home by the combination style cards arranged along a particular column and/or by the combination style cards arranged along a particular row.

DETAILED DESCRIPTION

Figure 1:
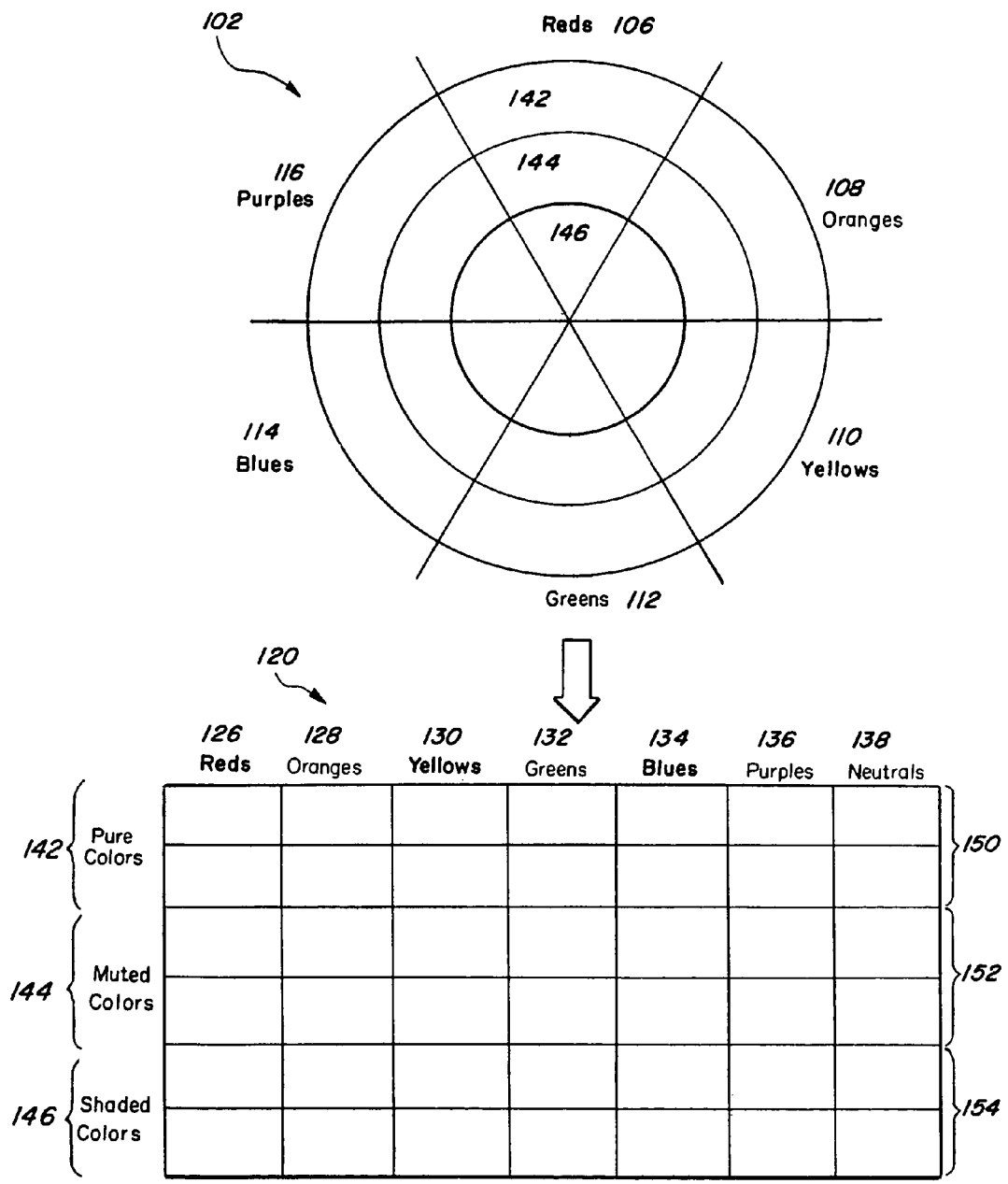
FIG. 1 illustrates how a tertiary color wheel may be mapped onto a paint color display according to one embodiment of the invention.

In the following description numerous specific details are set forth in order to provide a thorough understanding of the invention. However, one skilled in the art would recognize that the invention may be practiced without these specific details. In other instances, well known methods, procedures, and/or components have not been described in detail so as not to unnecessarily obscure aspects of the invention.

In the following description, certain terminology is used to describe certain features of one or more embodiments of the invention. For instance, a paint color "display" includes any cabinet, counter, advertising panel, card holders, etc., and combination thereof that may be used to exhibit paint color samples for customers or shoppers.

One aspect of the present invention provides a method for systematically arranging paint color samples for convenient browsing, identification, and/or selection of desired colors by shoppers. Paint color sample cards are arranged on a two-dimensional display surface such that colors having a similar hue angle, or colors that lie within a hue range, are categorized or grouped together (e.g., along a column) as a family of colors. For example, paint color sample cards having the same base hue or color are arranged on the same display region (e.g., column). Groups of paint color sample cards having different base hues or colors are arranged such that there is a gradual transition between paint colors from one region to the next region. For instance, the colors of sample cards may gradually change from column to column across a two-dimensional display array. Additionally, within each color group or family, paint color sample cards may be arranged from the most chromatic (purest) to the least chromatic colors (shaded). Thus, a customer may conveniently search for a desired color across columns and then search for the desired shade or tint down the rows.

Another aspect of the invention provides for accent color sample cards to be displayed adjacent to the various base color groups. For instance, along the region where red-based sample cards are displayed, color cards of white paint colors having a red tint are arranged to provide customers a convenient way to find accent colors.

Yet another feature of the invention provides for combination style cards to be arranged within each color family. The combination style cards may include one or more color schemes having one or more colors found in the color family in which the combination style card is placed. That is, the combination style cards are used to provide color schemes ideas to shoppers for some of the colors in the color display. In one implementation of the invention, the combination style card is a tri-fold card including three different color schemes. For each color scheme in the combination style card, a different room or environment or exterior may be exhibited or shown in the combination style card. Along each column and row of the color display, a plurality of different combination style cards may be displayed. The combination style cards may be organized such that a user may obtain color scheme ideas for every major room or environment of a home by the combination style cards arranged along a particular column and/or by the combination style cards arranged along a particular row.

FIG. 1 illustrates how a tertiary color wheel 102 may be mapped onto a paint color display 120 according to one embodiment of the invention. A tertiary color wheel 102 is a known way of arranging colors according to their hue, chroma, and lightness. The tertiary color wheel 102 is based on the basic primary color wheel of yellow, red, blue colors and includes six segments of gradually blending colors. These gradually blending colors have different hue angles within the tertiary color wheel 102. For example, the region between yellow 110 and red 106 colors define orange colors 108, the region between red 106 and blue 114 colors define purple colors 116, and the region between blue 114 and yellow 110 colors define green colors 112. The tertiary color wheel 102, and other color models, typically arrange colors so that they gradually blend from one color to the next.

One embodiment of the invention translates the color wheel, or any other color model, into a two-dimensional display arrangement to provide customers or shoppers convenient access and/or identification of paint colors. For instance, a paint color display 120 is arranged so that each column 126-136 in the color display represents a different segment, i.e., a range of hue angles, of the color wheel 102. Additionally, the columns 126-136 of the color display 120 may be maintained in the same order as the different segments 106-116 of the color wheel 102. For instance, if the order of the color wheel segments is 106-116, then the same order is maintained when arranging the corresponding columns 126-136 in the display 120.

Within each column, a plurality of paint color display cards may be organized such that the more chromatic colors (purest) are placed at the top of the columns and the less chromatic colors are placed at the bottom of the columns. That is, outer colors in the color wheel 102, typically the purest colors, are at the top of the column, the colors at the middle of the color wheel, typically more muted colors, are at the middle of the column, and the colors at the center/inner portion of the color wheel, typically more shaded colors, are at the bottom of the column. For instance, paint colors 142-146 in the Red segment 106 of color wheel 102 may be arranged from top to bottom of a corresponding column 126, with the outer color 142 at the top of the column 126 and the inner color 146 at the bottom of the column 126.

Within each category 142, 144, or 146 of a column or color family, the colors may be arranged according to their hue angle in the corresponding color model (e.g., color wheel 102).

In one embodiment of the invention, an additional column 138 may be included in the paint color display 120 to display a particular category of colors. Such column 138 may serve to display a particular family of colors. For example, column 138 may display neutral colors in having different undertones. Yellow-toned neutral colors may be displayed at the top 150 of column 138, followed by red-toned neutral colors in the middle portion 152 of column 138, and blue-toned neutral colors in the bottom portion 154 of column 138. According to one embodiment of the invention, the selection of colors that are placed in column 138 may be based on human expertise selection.

Figure 2:
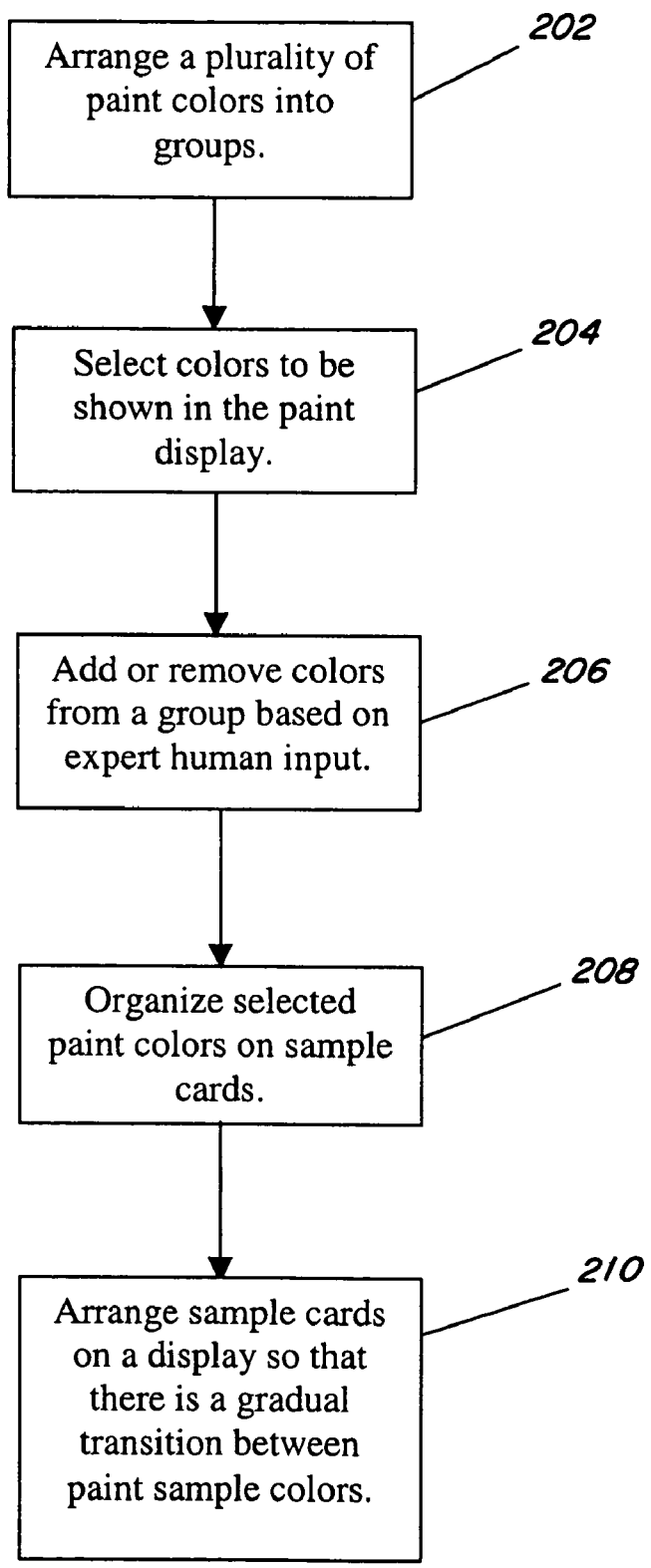
FIG. 2 illustrates a method for arranging paint color samples in a color display according to one embodiment of the invention.

FIG. 2 illustrates a method for arranging paint color samples in a color display according to one embodiment of the invention. The colors of a color wheel, or a color model are divided into groups, categories, families, or segments 202. This may be done, for example, by dividing colors in a color wheel based on hue angle. A plurality of colors from each group, category or segment are selected for display 204. Colors may be added or removed from a group, category or segment based on expert human input 206. The selected paint colors are then organized on sample cards 208. Each sample card may include one or more paint colors.

According to one implementation of the invention, each sample card includes a plurality of paint color samples belonging to the same category. The paint color samples in each paint sample card may be organized according to shade, hue, and/or chroma. For instance, a sample card may include three colors having approximately the same hue angle but having varying chromatic values.

The sample cards are then arranged on a two-dimensional display so that there is a gradual transition between paint sample colors 210, both in the horizontal and vertical directions. For instance, paint color samples may have a gradual change in color hue angles from column to column and a gradual change in shades from row to row.

Figure 3:
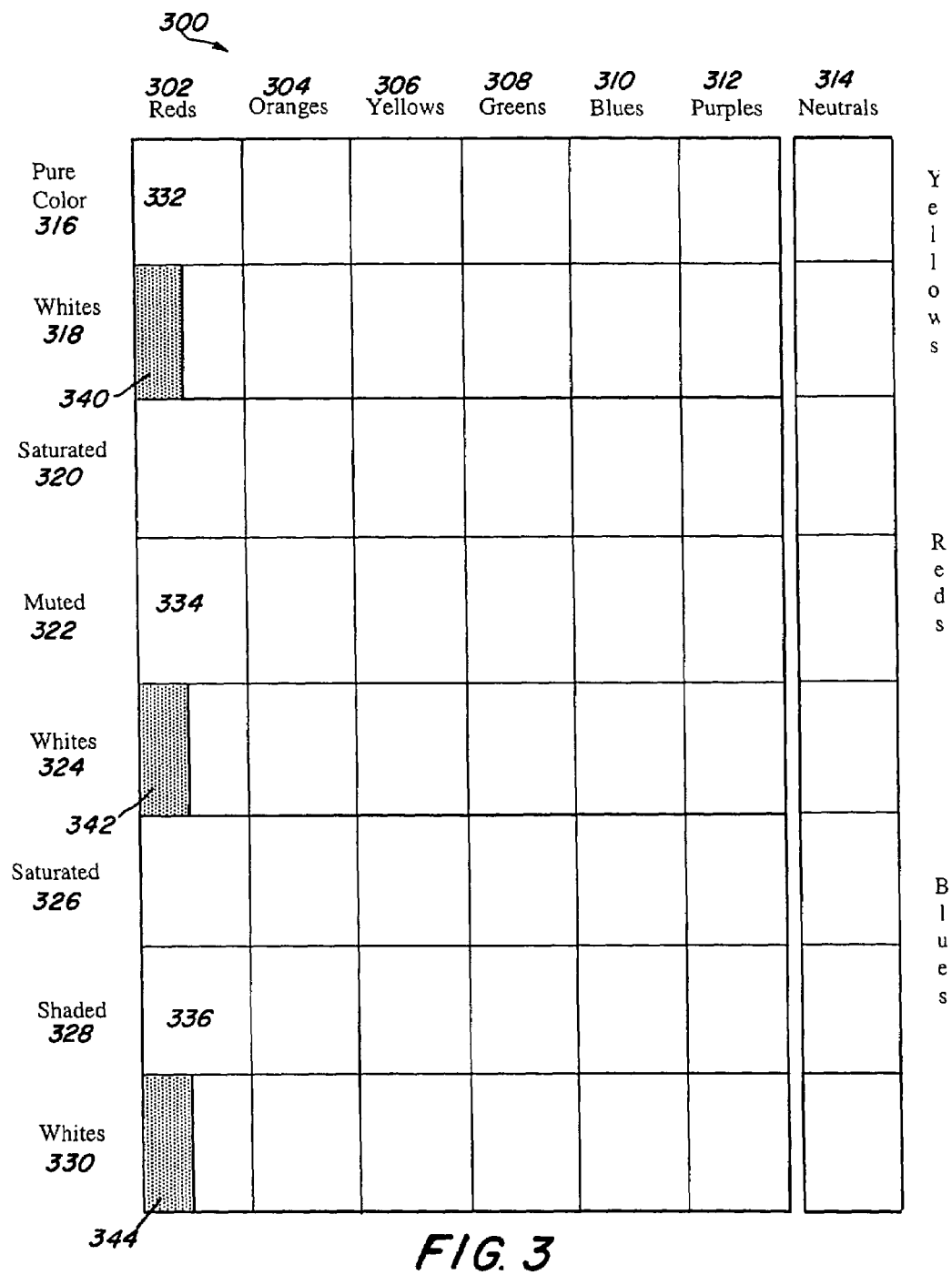
FIG. 3 illustrates a paint color display according to one embodiment of the invention.

FIG. 3 illustrates a paint color display according to one embodiment of the invention. This paint color display 300 may be arranged so that there is a gradual transition between paint colors. For instance, from columns 302-312, there may be a gradual change in the hue angles of the paint colors displayed therein. Additionally, the paint color display 300 may also be arranged so that there is a gradual change in the shades or chroma of colors from row to row. For instance, from rows 316-330 the red-based paint colors may transition from pure red colors 332 to more muted red colors 334 to light shades of red 336. Along each column or family of colors, as the chroma of a particular base-color changes, one or more whites colors 340-344 of similar tint may be placed alongside the other color samples. These white colors 340-344 are white paint colors having similar tint as the neighboring colors so that they may be aesthetically pleasing when used together.

According to one implementation of the invention, the paint color display 300 may be arranged into a plurality of columns, each column corresponding to a segment of a color wheel. For ease of color identification, each column may be associated with a number that is also used to identify the paint colors in that column. For example, each paint color card arranged under column "100" may include a unique number, e.g., "110-D", "158-A", etc., that identifies colors in that column.

According to one implementation of the invention, each column includes a plurality of color cards arranged from the purest color (i.e., most chromatic) to the most shaded color (least chromatic). Such arrangement permits a person to visually search the various shades of colors and identify the desired paint color.

In one implementation of the invention, a two-dimensional array paint color display system 300 includes a plurality of paint sample cards and is arranged so as to assist customers in the selection of paint colors. A plurality paint sample cards, each having one or more paint color samples, are selected from only one of a plurality of contiguous hue portions (e.g. 106-116, in FIG. 1) of a full range of known color hues such that each hue in each of said hue portions (e.g., 106 in FIG. 1) is closely related to or the same as each other hue in that same hue portion.

Within each region or family of colors representing a hue portion (e.g. paint colors having a similar hue) 302-314, paint color sample cards may be arranged according to either increasing or decreasing hue values in a first dimension of the two-dimensional array paint color display 300 and according to either increasing or decreasing chromatic values in a second dimension of two-dimensional array paint color display. In one implementation of the invention, adjacent paint color sample cards in each region represent substantially equal intervals of visual color perception. According to one embodiment of the invention, the two-dimensional array paint color display 300 includes a plurality of regions, portions or areas 302-314 of non-overlapping hue groups. The plurality of hue portions 302-312 may span the full range of known color hues.

Figure 4:
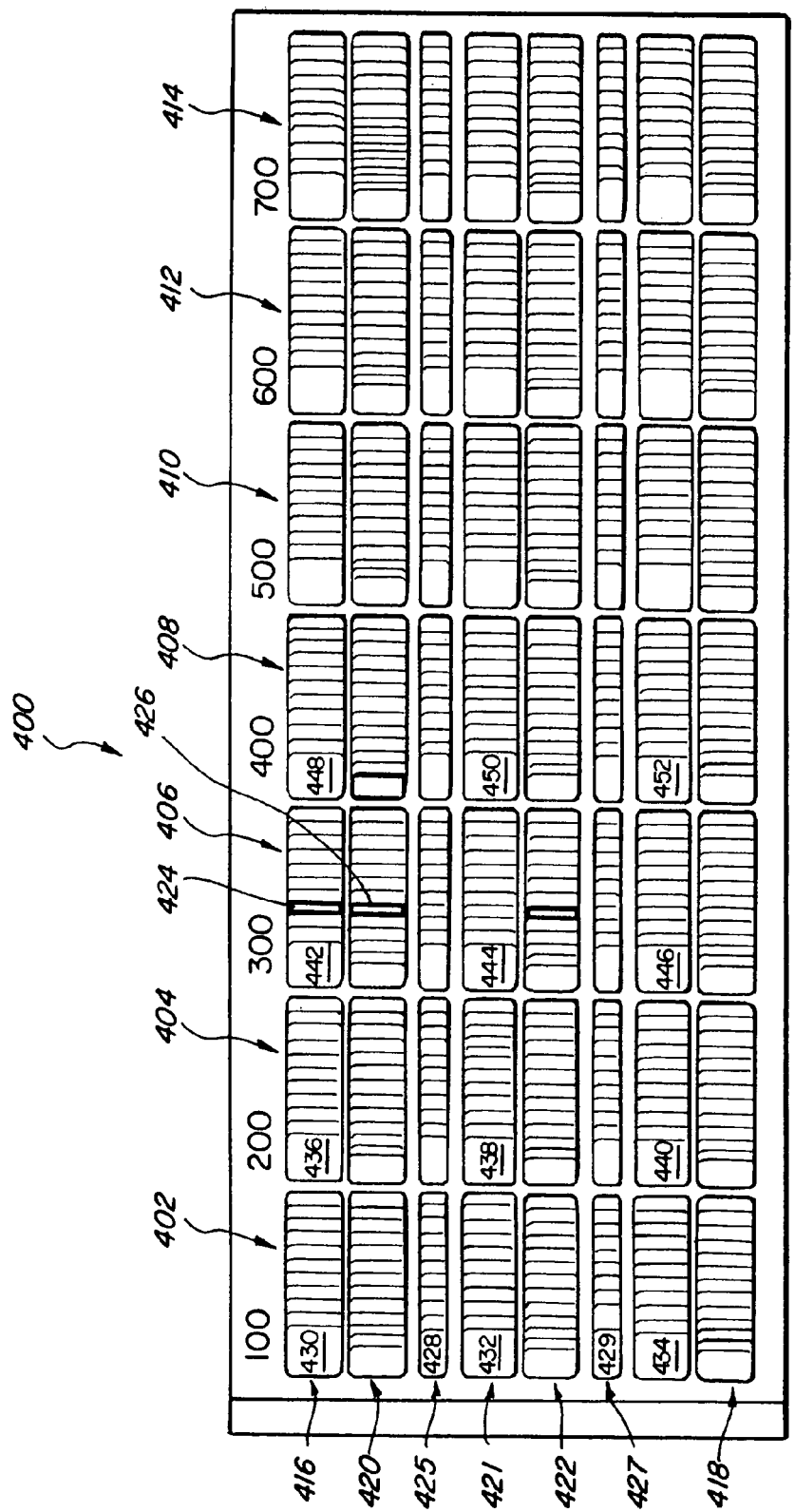
FIG. 4 illustrates a paint color display according to one embodiment of the invention.

FIG. 4 illustrates a paint color display according to one embodiment of the invention. Like the paint color display of FIG. 3, each column 402-412 includes colors of a particular hue and arranged based on their chromatic value. Similar to the arrangement illustrated in FIG. 3, each column 402-412 corresponds to a particular range of hues, with the colors arranged based on their relative chromatic value within a column. For instance, the most chromatic colors may be found on row 416 and the least chromatic colors in row 418, with their relative chromatic value decreasing from left to right. Such arrangement of colors permits a user to browse across the columns for a desired hue and then browse up and/or down along a the rows to find the desired color.

In one embodiment of the invention, a portion or all of rows 418, 420, and 422 may include white colors of similar tone as the surrounding color samples. Such positioning of similarly-toned white colors is intended to provide an easy way for a consumer, who has selected a desired paint color, to find an appropriate white paint color. For instance, if a user selects a color in color card 424, then the user may find an appropriate white paint color by browsing the adjacent or proximate white paint color samples 426.

According to another aspect of the invention, an additional column 414 may be appended to the rest of the display 400 for displaying a special category of colors (e.g., neutrals, earth-tones, etc.) that have been selected based on human expertise and may be arranged according to their respective underlying tones (e.g., yellow, red, blue, etc.).

Yet another aspect of the invention provides for one or more rows 425 and 427 to include paint sample cards of individual paint colors. For instance, each sample card in row 425 may contain a different saturated color found in rows 416 and/or 420. Similarly, each sample card in row 427 may contain a different saturated color found in rows 421 and/or 422.

Another feature of the invention provides for a plurality of combination style cards to be displayed along each column 402-414. The combination style cards are used to provide color schemes ideas to shoppers for some of the colors in the color display. In one implementation of the invention, a combination style card is a tri-fold card including three different color schemes. For each color scheme in the combination style card, a different room or environment or exterior may be exhibited or shown in the combination style card.

A plurality of combination style cards 430-452 may be laid out at particular locations (e.g., the beginning of one or more rows) along one or more columns of the color display. A plurality of different combination style cards, showing different color schemes and sample rooms or environments, may be displayed. The combination style cards may be organized such that a user may browse color scheme ideas for every major room or environment of a home. For instance, for each color scheme in each combination style card, a sample room of a home (e.g., kitchen, family room, dining room, living room, bathroom, entrance, hallways, etc.) may be depicted as painted with the particular color scheme. By browsing the combination style cards down a particular column or color family, a user is shown color schemes having the same base hue (or within a color family) for every room in a home. In this manner, a user is able to select color schemes having the same base hue (or color family) for every room or environment in a home from the combination style cards (e.g., 430, 432 and 434) arranged along a column.

Additionally, the combination style cards may also be used to suggest color schemes for a plurality of rooms in a home, where the color schemes are based on two or more base colors. For instance, a user may select combination style cards (e.g., 432, 438, 444) arranged along a particular row (e.g., 421) in adjacent columns to obtain color schemes having different base colors. In one implementation of the invention, each combination style card shows three color combinations of typically related or adjoining rooms within a home. A user may select combination style card 432 having a sample entrance, living room and dining room using three different color schemes and the same first base color. The user may then select combination style card 438 having a sample kitchen, family room, and breakfast nook with three different color schemes and the same second base color. Lastly, the user may select combination style card 444 having a sample master bedroom, second bedroom, and bathroom with three different color schemes and the same third base color.

The combination style cards 430-452 are thus arranged to provide a user of the display the opportunity and ease of selecting paint color schemes for a whole house by selecting the combination style cards along a particular column or row.

Figure 5:
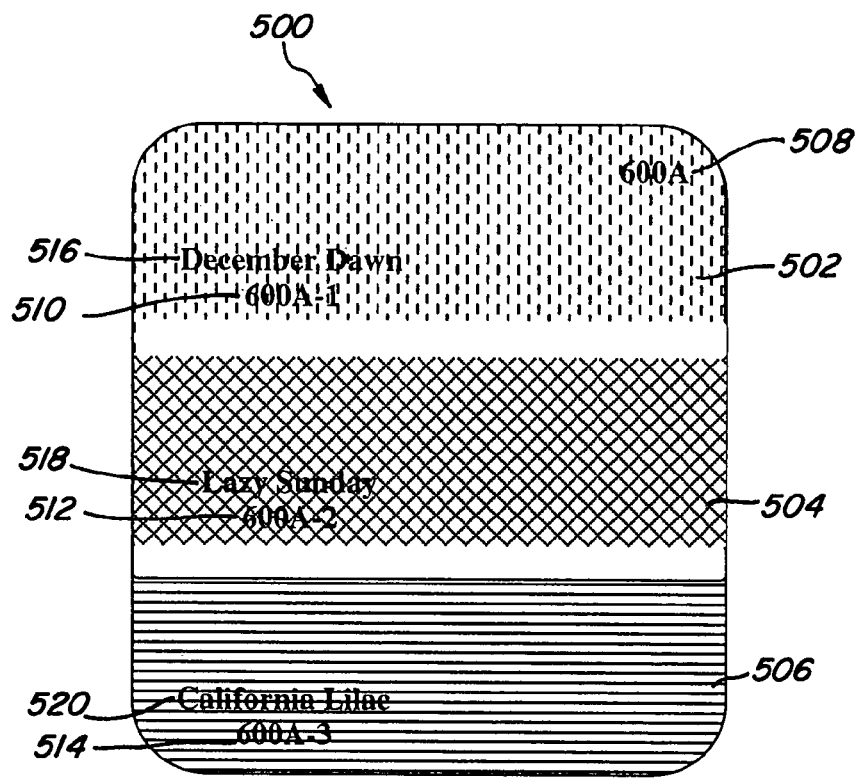
FIG. 5 illustrates a first view of a paint sample card according to one embodiment of the invention.

FIG. 5 illustrates a first view of a paint sample card 500 according to one embodiment of the invention. The paint sample card may be used in the paint color display unit illustrated in FIGS. 2 and 3. A paint sample card 500 may include a plurality of paint colors samples 502, 504, and 506 that are related to each other. For instance, the paint color samples 502, 504, and 506 may be different shades of the same color hue. Within a sample card, the paint color samples may be arranged from the lightest paint color 502 to the darkest paint color 506.

According to one aspect of the invention, each color sample card may include one or more colors of similar hue but having varying chromatic values. The color samples on each color sample cards may span less than a total hue range and a total chroma range for the corresponding hue region or portion represented by that display. Each color sample card may represent a different hue range that is non-overlapping with other color sample cards in the same group.

According to one embodiment of the invention, a unique number or identifier 508 may identify a paint color card 500. Similarly, each paint color sample on a card may have a unique number or identifier 510, 512, 514 identifying the paint color shown. The numbers or identifiers for each paint color may be associated with the number or identifier for the paint color card. For instance, if a color card is identified by "600A" 508 then the paint colors thereon may be identified as "600A-1" 510, "600A-2" 512, and "600A-3" 514.

In one embodiment of the invention, each paint color sample 502 may also include a catchy name 516 that is descriptive, characteristic, and/or suggestive of the color. For example, names like "December Dawn" 516, "Lazy Sunday" 518, and "California Lilac" 520 maybe used to describe colors in a color card 500.

Figure 6:
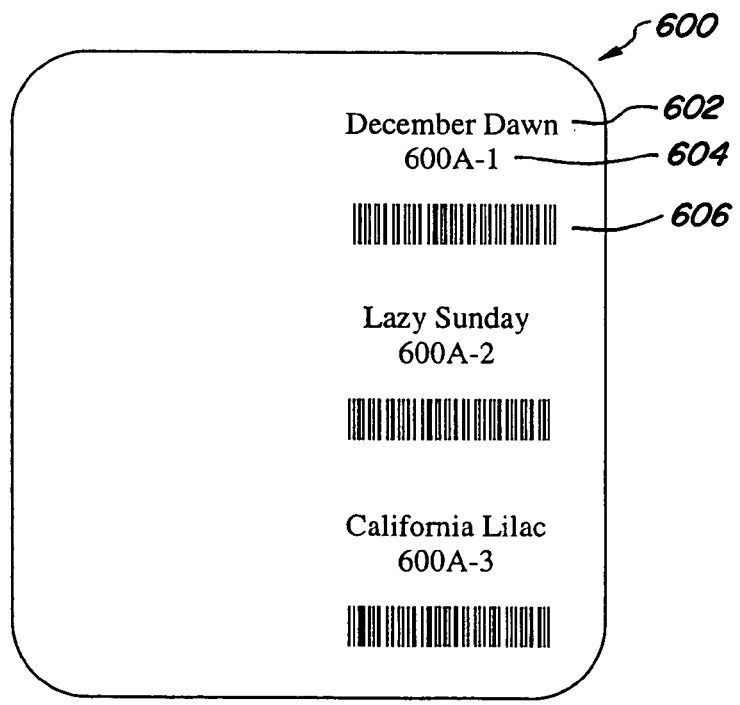
FIG. 6 illustrates a second view of a paint sample card according to one embodiment of the invention.

FIG. 6 illustrates a second view of a paint sample card 600 according to one embodiment of the invention. The illustrated second view 600 may correspond to the opposite side of the paint color card 500 illustrated in FIG. 5. For each paint color on the opposite side of the card 600, the color name 602 and associated paint number or identifier 604 may appear in a corresponding location on the card 600. According to one implementation, for each sample color in a paint sample card 600, a unique bar code 606 may be placed on the card 600. This unique bar code 606 may serve to enter the desired paint color into a computer or scanning system and facilitate purchase or mixing of the corresponding paint.

Figure 7:
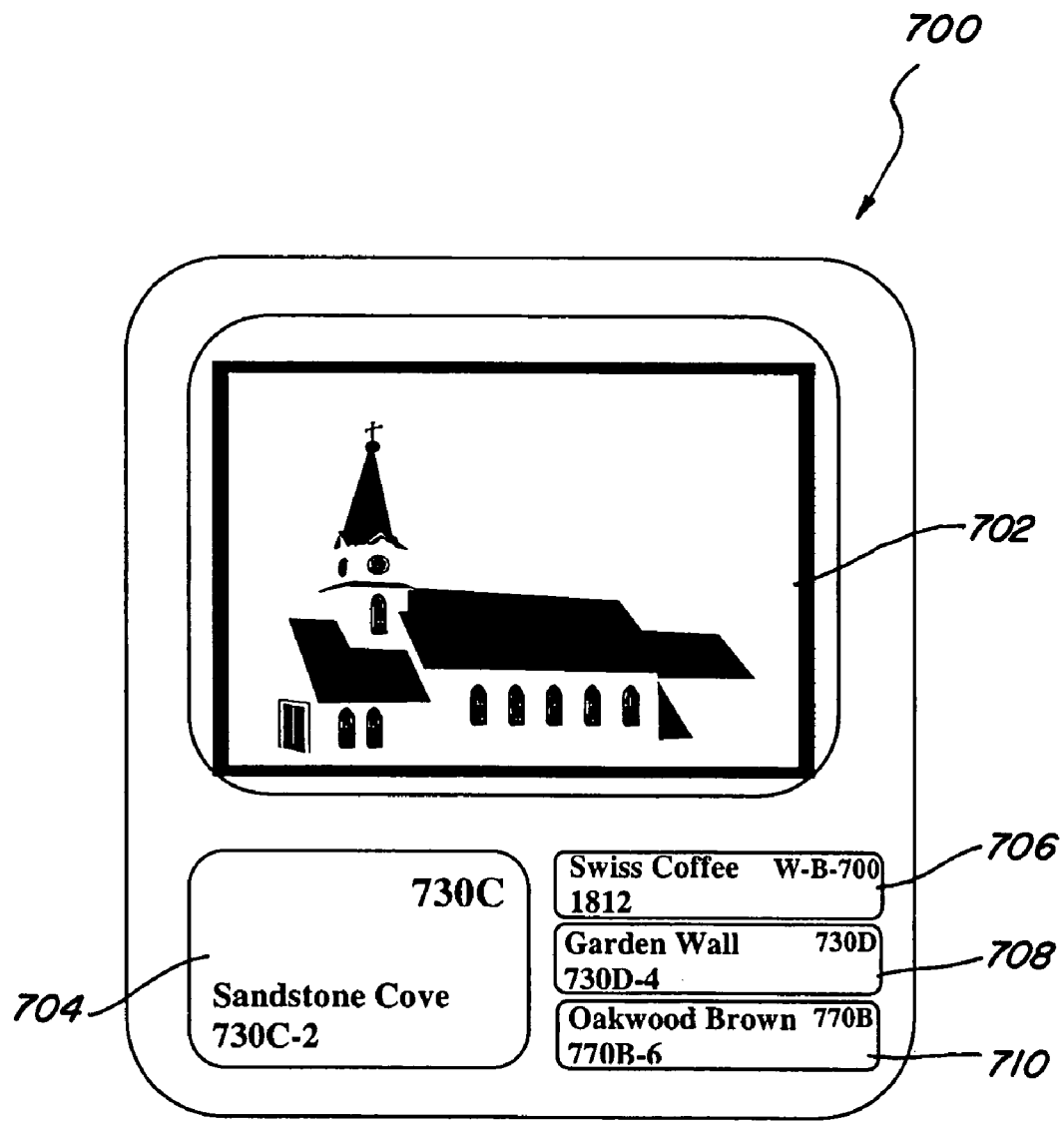
FIG. 7 illustrates a theme paint color sample card according to one embodiment of the invention.

FIG. 7 illustrates a theme paint color sample card 700 according to one embodiment of the invention. A paint sample card 700 may represent a color style (e.g., Yellow-toned Neutral). The card may include a depiction of a house interior or exterior 702 painted using a particular color scheme that includes a plurality of paint colors. For instance, the house interior or exterior 702 may be shown as painted in a four-color scheme. Paint color samples 704, 706, 708, and 710 for the illustrated color scheme may be placed in the card 700. Each of the paint colors in the samples 704, 706, 708, and 710 may have an associated name and/or unique identifier to help shoppers identify each color. The color-scheme may be selected using color theory and/or expert input.

According to one embodiment of the invention, the paint color samples of a color-scheme may have different sizes depending on their purpose. For example, a larger color sample size 704 indicates a wall paint color while smaller paint color sample sizes may indicate trim 708, accent 710, and/or white 706 paint colors.

FIGS. 8-11 illustrate a plurality of combination style cards that include color schemes and room samples and may be arranged in a particular order that facilitates obtaining a room-by-room paint scheme for a house according to one embodiment of the invention. These tri-fold combination style cards include three color schemes and a corresponding sample room for each color scheme. Each corresponding sample room is painted according to one of the associated color schemes in the combination style card. The cards illustrated in FIGS. 8-11 may be some of the combination style cards shown in display illustrated in FIG. 4.

One aspect of the invention provides an arrangement of color schemes that may be used to paint a whole house. For example, where a home is to be painted using a particular family of color or base hue, a user may select from the combination style cards along the particular column corresponding to the desired color family or base hue. Each combination style card in said column includes one or more color schemes, with each color scheme including one or more colors in said column. For each color scheme in a combination style card, the combination style card includes a sample room illustration having its various surfaces, walls, doors, frames, windows, ceiling, etc., painted according to the color scheme.

According to one implementation of the invention, the combination style cards found in a column or color group illustrate the various rooms of a conventional home painted according to a corresponding color scheme. Each combination style card may include a set of rooms that may typically be adjacent to each other in a typical home. Thus, each combination style card may provide a plurality of color schemes that work together across various adjacent rooms or areas of a home.

In one embodiment of the invention the combination style cards found along a column or color family of a display each has illustrations and color schemes of different of rooms found in a typical home. That is, a first card may illustrate an entrance, a living room and a family room, a second card may illustrate a kitchen, dining room, and hallway, and a third card may illustrate a master bedroom, bathroom, and study. Thus, a user may be able to find color schemes for every room and environments in a home by browsing the combination style cards for a desired base hue.

Another aspect of the invention enables a user to select color schemes having different base colors or hues. For instance, a user may select from three contiguous hues or color families (e.g., reds, oranges, and yellows) to select color schemes that the various rooms or environments in a home. Harmonious color schemes across color families may be selected from combination style cards Another aspect of the invention provides for Referring to FIG. 8, a set of tri-folding combination style cards are illustrated therein. These cards may correspond to the combination cards found in column 402 of FIG. 4. For example, combination style cards 802, 804, and 806 may be arranged at the locations corresponding to cards 430, 432 and 434 in FIG. 4, respectively. Similar to the card illustrated in FIG. 7, each combination card includes three color schemes 810, 812, and 814 with corresponding samples of rooms or environments 816, 818, and 820 painted according to the associated color scheme 810, 812, and 814. A user may select combination style cards 802, 804, and 806 to obtain nine harmonious color schemes that may be used together to paint a conventional home. The various combination cards 802, 804, and 806 may provide different, yet harmonious, colors schemes using the same base color or family of colors. For example, combination card 802 may provide nine color schemes using red-based colors. These nine color schemes may enable a user to paint a home using a plurality of the harmonious color schemes. For instance, card 802 illustrates samples of a painted den, bedroom and bathroom, card 804 illustrates samples of a painted dinning room, living room, and hall, and card 806 illustrates samples of a painted family room, den, and kitchen.

According to one implementation of the invention, each color scheme 810, 812, and 814 in a combination card 802 includes a main color 822, 824, and 826 which belongs to the color family or column in which the combination card is displayed. In one implementation, each main color 822, 824, and 826 in a card 802 has a different chromatic value (shade) within the color family. For example, in card 802 color 822 may have a medium chromatic value, color 824 may have a light chromatic value and color 826 may have a deep chromatic value. The order in which the light, medium, and deep main colors are arranged may vary from combination cards to combination card. For instance, in card 804 color 828 may have a light chromatic value, color 830 may have a deep chromatic value, and color 832 may have a medium chromatic value. Similarly, in card 806 color 834 may have a deep chromatic value, color 830 may have a medium chromatic value, and color 832 may have a light chromatic value. Such rotation of the order of the relative chromatic values for the main colors in each color scheme is intended to generate aesthetically pleasing color scheme combinations. In another embodiment of the invention, the main colors within a combination style card may vary according to their relative hue angle instead of their relative chromatic values.

Figure 9:
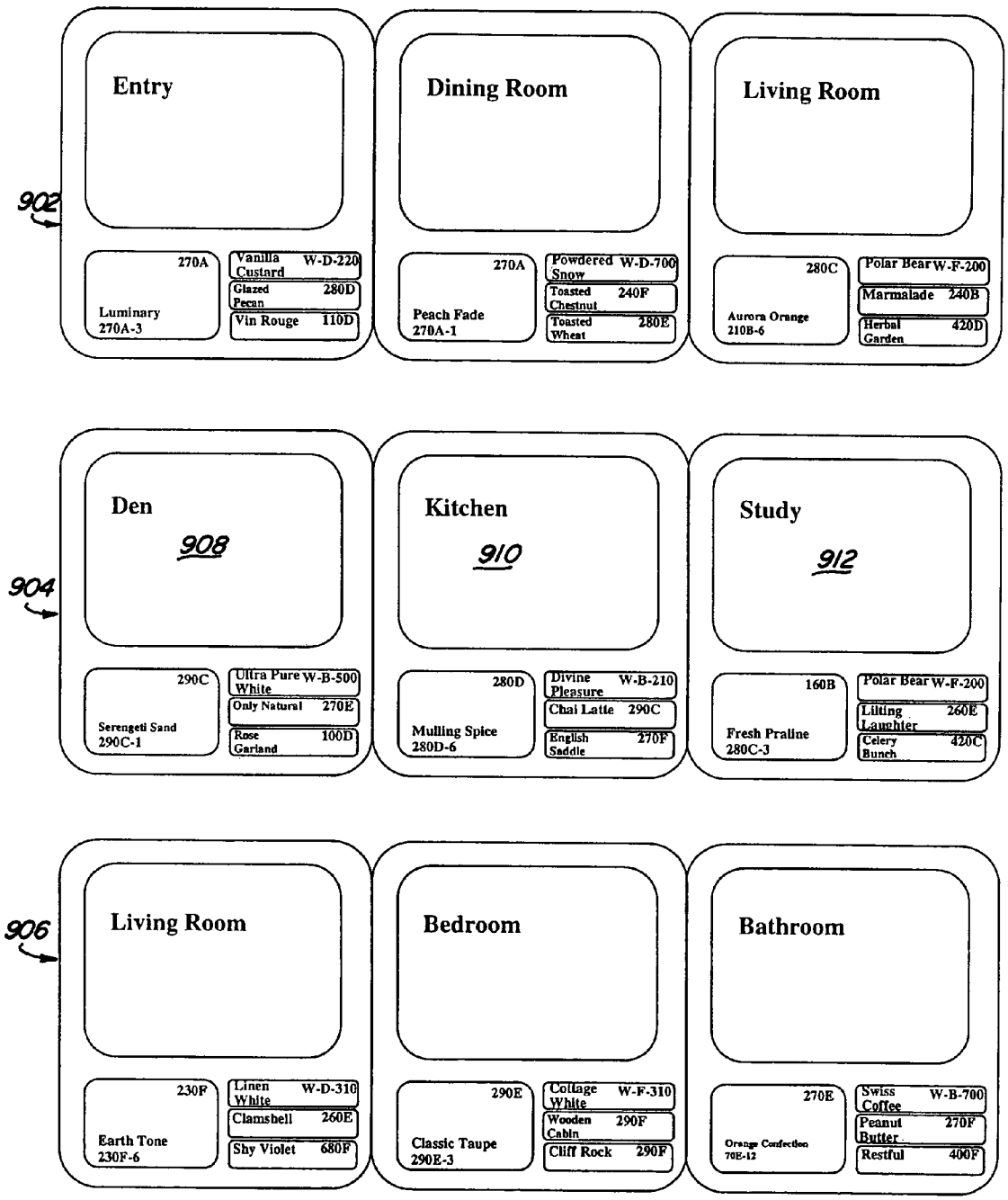
Figure 10:
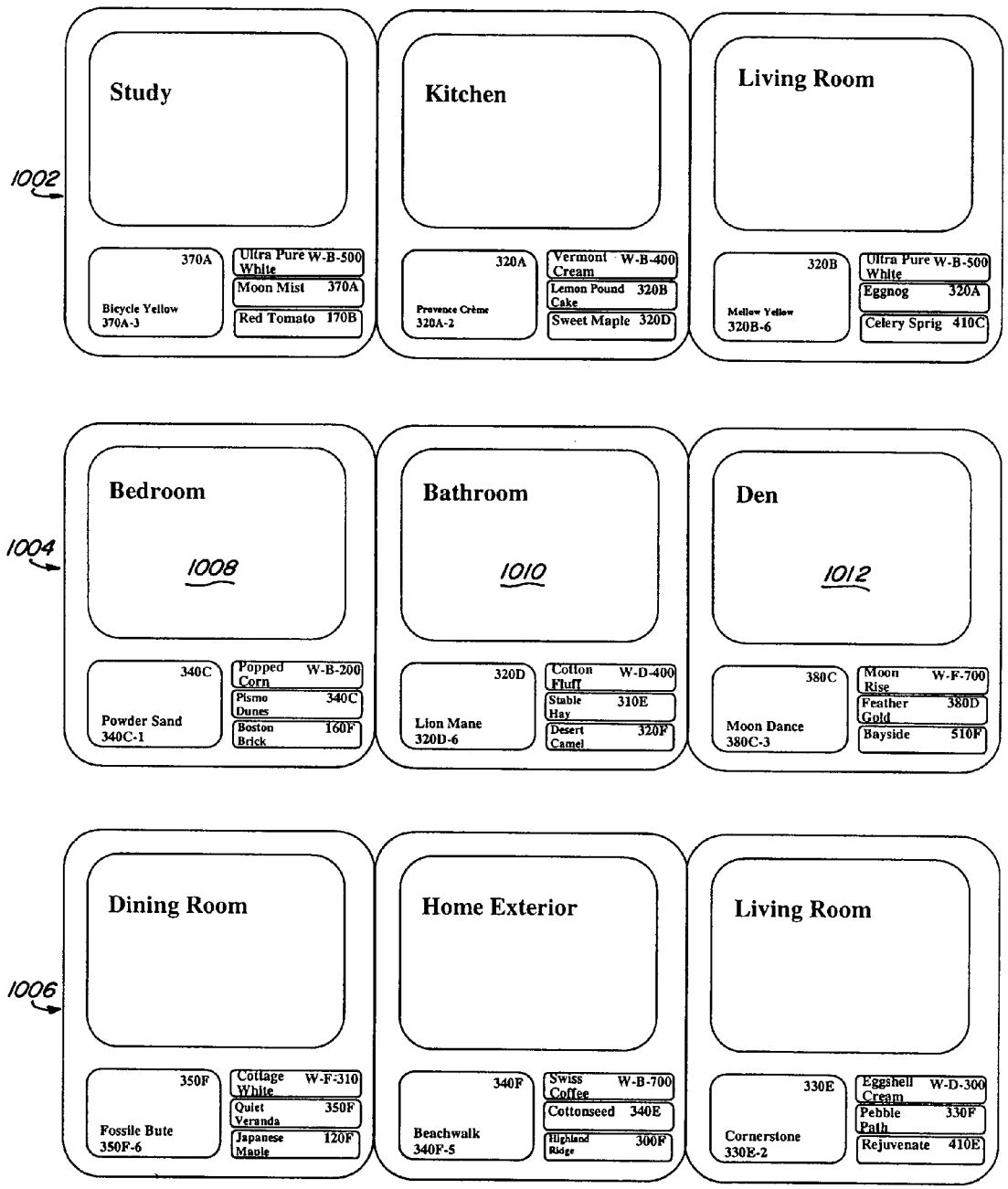
Figure 11:
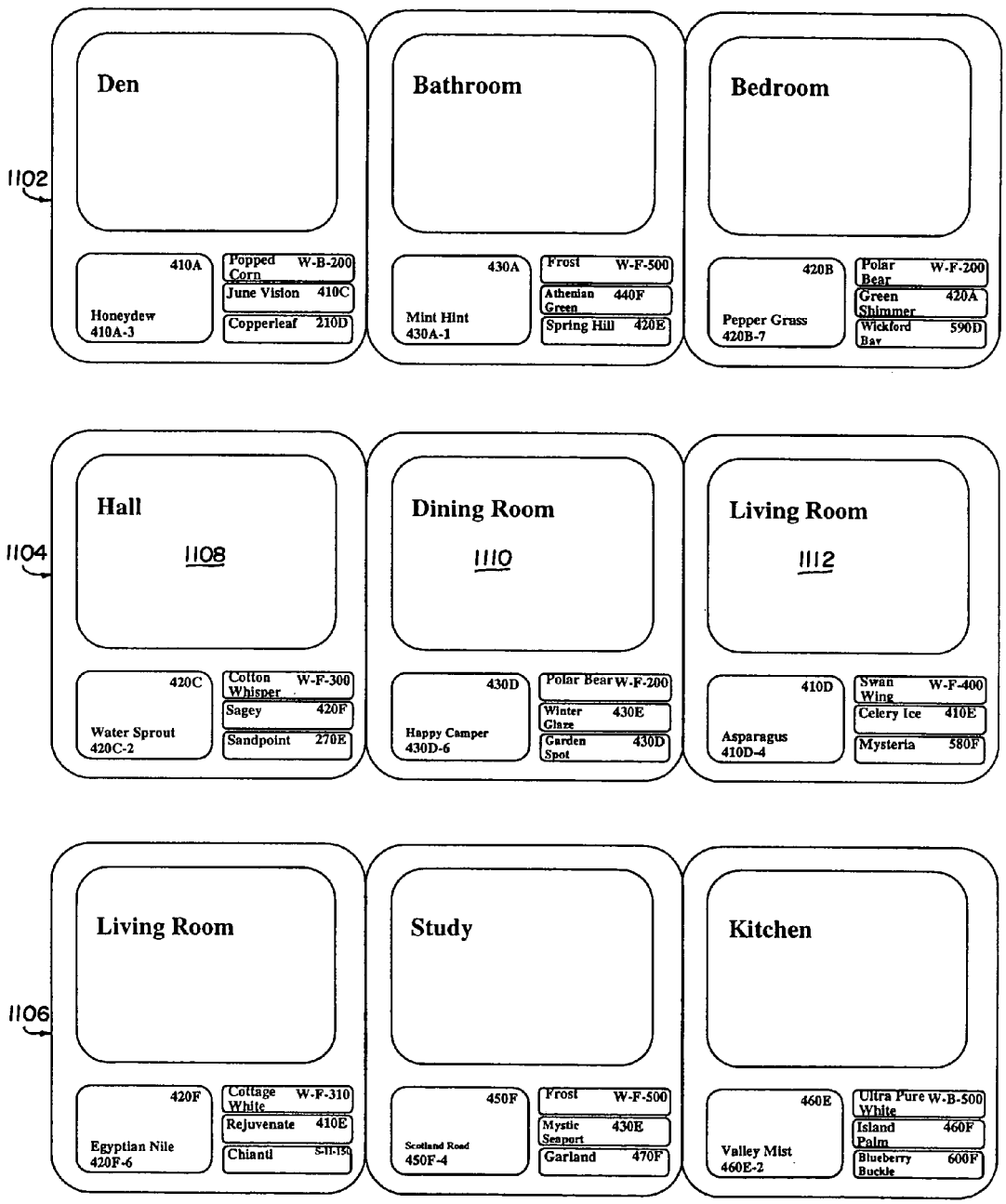

FIGS. 9-11 similarly illustrate combination style cards having various color schemes and associated sample rooms. In one implementation of the invention, combination style cards 902, 904, and 906 in FIG. 9 may be arranged at the locations corresponding to cards 436, 438 and 440 in FIG. 4, respectively; combination style cards 1002, 1004, and 1006 in FIG. may be arranged at the locations corresponding to cards 442, 444 and 446 in FIG. 4, respectively; and combination style cards 1102, 1104, and 1106 may be arranged at the locations corresponding to cards 448, 450 and 452 in FIG. 4, respectively.

As previously mentioned, a user may also wish to select color schemes having different main colors or running across two or more columns of a two-dimensional color display. One embodiment of the invention arranges combination style cards in such a way that a user can select from coordinating color schemes across different base hues. A user may find color scheme suggestions for every room or environment of a convention home by browsing the combination style cards across a given row of a two-dimensional color display. For instance, a user may find harmonious color combination schemes by browsing cards 432, 438 and 444 in FIG. 4.

Figure 8:
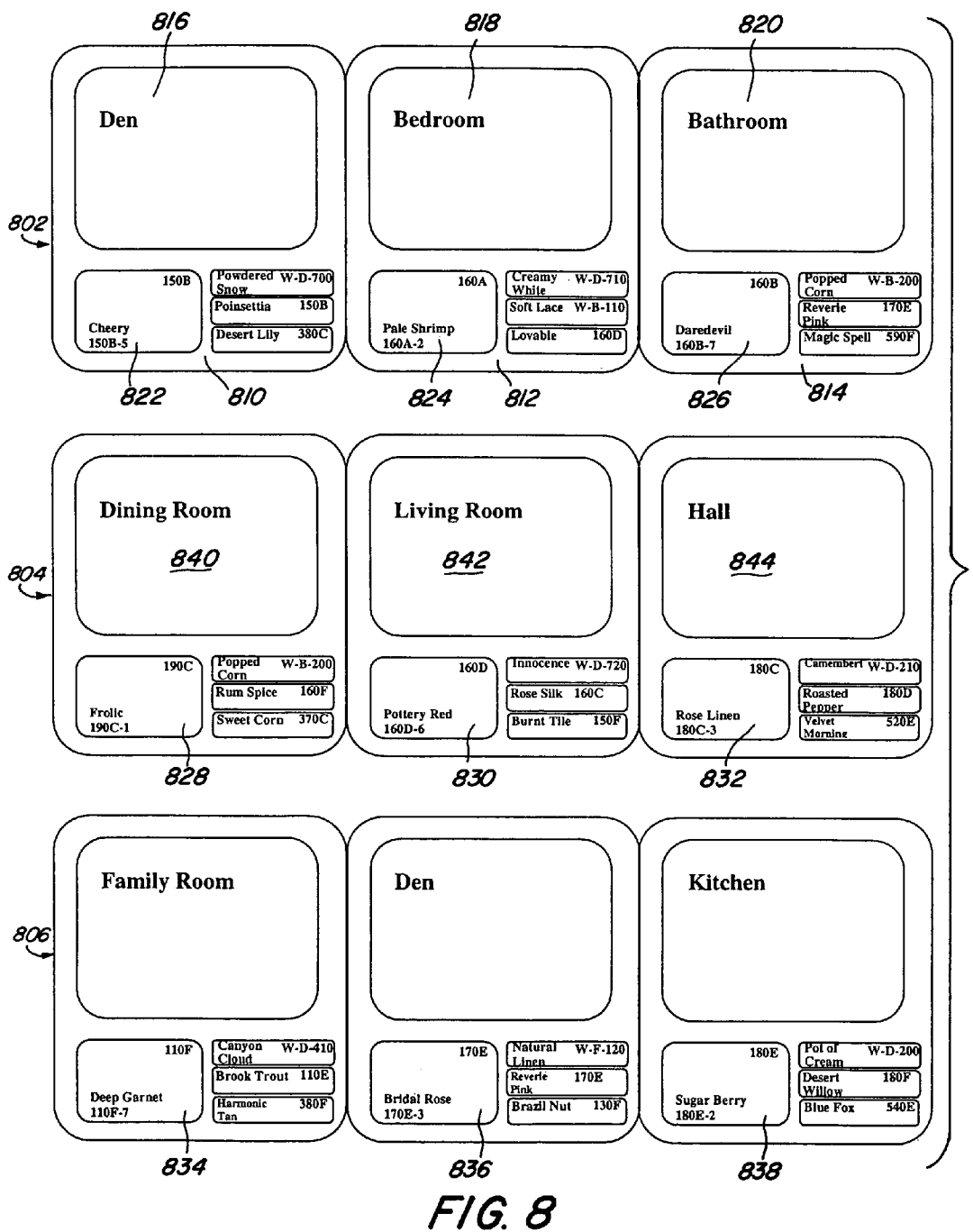
FIGS. 8-11 illustrate a plurality of combination style cards that include color schemes and room samples and may be arranged in a particular order that facilitates obtaining a room-by-room paint scheme for a house according to one embodiment of the invention.

In one implementation of the invention, card 804 in FIG. 8, card 904 in FIG. 9, and card 1004 in FIG. 10 correspond to cards 432, 438, and 444, in FIG. 4, respectively. A user may find red-based color schemes and samples of a dining room 840, living room 842 and hall 844, orange-based color schemes and samples of a den 908, kitchen 910, and study 912, and yellow-based color schemes and samples of a bedroom 1008, bathroom 1010, and den 1012. Similarly, a user may browse across any of the other rows of a two-dimensional color display to find color schemes and suggestive samples for the various rooms and environments of a home.

According to one implementation of the invention, the sample rooms and environments may repeat every three columns. For example, card 804 in FIG. 8, which may correspond to the first column card location 432 in FIG. 4, and card 1104 in FIG. 11, which may correspond to the fourth column card location 450 in FIG. 4, both have a sample hall 844 and 1108, sample living room 842 and 1112 and sample dining room 840 and 1110. Thus, in FIG. 4, a user may also select combination cards 440, 446 and 452, for example, to create a harmonious color scheme across different rooms and using different base hues. Typically, when selecting color schemes having different base hues, it is preferable to select combination style cards that have adjacent or neighboring base colors as their main color since this tends to improve the harmony between color schemes.

In other implementations of the invention combination style cards, a combination style card may have one or more color schemes and/or sample rooms without departing from the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. An apparatus comprising:
a two-dimensional paint sample card display unit adapted for displaying physical color sample cards in a plurality of columns and rows;
a first plurality of physical paint sample cards arranged on the display unit according to groups of different hue and chroma with the paint colors on the physical paint sample cards varying in hue, in a first direction, and varying in chroma, in a second direction; and
one or more physical color combination paint sample cards disposed adjacent to each group of different hue and chroma physical paint sample cards, each physical color combination paint sample card containing a plurality of paint samples having the same base hue as the hue of the group it is adjacent to, and a picture of a building or a room painted with the plurality of colors on the physical color combination paint sample card.

2. The apparatus of claim 1 wherein the size of the paint sample on the physical combination paint sample card varies in size according to the area painted in the picture with this color.

3. The apparatus of claim 1 further comprising:
a second plurality of physical paint color sample cards disposed adjacent to the first plurality of physical paint sample cards, based on expert human input.

4. The apparatus of claim 3 further comprising:
a third plurality of physical paint sample cards arranged in groups, each group adjacent to a group in the first plurality of physical paint sample cards, the third plurality of physical paint sample cards having white paint of similar tint as the paint sample on the groups of the first plurality of physical paint sample cards it is adjacent to.

5. The apparatus of claim 1
wherein the first plurality of physical paint sample cards are arranged in columns in the two-dimensional display unit, with the most chromatic physical paint sample card at the top of the column, with gradually decreasing chromatic physical paint sample cards below to the least chromatic at the bottom of the column.

6. The apparatus of claim 1 wherein each of the first plurality of physical paint sample cards carries two or more paint colors of similar hue that have varying chromatic values.

7. The apparatus of claim 1 wherein
the groups of different hue and chroma are arranged according to either ascending or descending hue value in a first dimension, and according to either ascending or descending chromatic value in a second dimension of the display unit.

8. The apparatus of claim 1 wherein each color combination physical paint card comprises a single card that includes a base hue sample and a plurality of complementary color samples arranged adjacent to the base hue sample.

9. The apparatus of claim 8 wherein the base hue sample is larger in size than the complementary color samples.

10. The apparatus of claim 8 wherein at least one of the complementary color samples comprises one white color sample selected from a plurality of white colors.

11. The apparatus of claim 1 wherein each physical color combination card comprises a single card that includes a base hue sample and a plurality of complementary color samples arranged adjacent to the base hue sample.

12. The apparatus of claim 11 wherein the base hue sample is larger in size than the complementary color samples.

13. The apparatus of claim 11 wherein at least one of the complementary color samples comprises one white color sample selected from a plurality of white colors.

14. A paint sample display unit comprising:
a two-dimensional paint sample card display unit adapted for displaying physical color sample cards in a plurality of columns and rows;
a first plurality of physical paint sample cards, each physical paint sample card carrying a paint color of similar hue but different chroma to every other physical paint sample card of the first plurality, the first plurality of physical paint sample cards with similar hue being arranged in a first column of the paint sample card display unit, from most chromatic to least chromatic;
a second plurality of physical paint sample cards carrying a paint color of similar hue but different chroma to every other physical paint sample card of the second plurality, the second plurality of physical paint sample cards being arranged in a second column of the paint sample card display unit, from most chromatic to least chromatic; and
one or more physical color combination paint sample cards adjacent to each chromatic group of the first plurality of physical paint sample cards and the second plurality of physical paint sample cards, each physical color combination sample card containing a plurality of paint samples having the same base hue as the hue of the group it is adjacent to and a picture of a building or room painted with the plurality of paint sample colors on the physical color combination paint sample card.

15. The paint sample display unit of claim 14 wherein each of the first plurality of physical paint sample cards carries two or more paint colors of similar hue but having varying chromatic value.

16. An apparatus comprising:
a two-dimensional paint sample card display unit adapted for displaying physical color sample cards in a plurality of columns and rows;
a first plurality of physical paint sample cards arranged on the display unit according to groups of different hue and chroma so that the paint colors displayed on the physical paint sample cards vary in hue in a first direction and vary in chroma in a second direction; and
one or more physical color combination style cards disposed adjacent to each group of different hue and chromatic physical paint sample cards, each physical color combination style card having a tri-fold card with three separate sections, each separate section containing a plurality of paint samples having the same base hue as the hue of the group the tri-fold card is adjacent to, and a picture of a room painted with the plurality of paint sample colors on the section, each section of the tri-fold card having a picture of a different room.

17. The apparatus of claim 16 wherein the size of the paint sample on each separate section of the tri-fold card varies in size according to the size of the area painted in the picture with the respective paint sample.

18. The apparatus of claim 16 further comprising:
a second plurality of physical paint color sample cards disposed adjacent to the first plurality of physical paint sample cards based on expert human input.

19. The apparatus of claim 18 further comprising:
a third plurality of physical paint sample cards arranged in groups, each group adjacent to a group in the first plurality of physical paint sample cards, the third plurality of physical paint sample cards having white paint of tint similar to that of the paint samples on the adjacent group of first plurality of physical paint sample cards.

20. The apparatus of claim 16 wherein the first plurality of physical paint sample cards are arranged in columns in the two-dimensional display unit, with the most chromatic physical paint sample card at the top of the column, with gradually decreasing chromatic physical paint sample cards progressing to the least chromatic at the bottom of the column.

21. The apparatus of claim 16 wherein
the groups of different hue and chroma are arranged according to ascending or descending hue value in a first dimension and according to either ascending or descending chromatic value in a second dimension of the display unit.

22. A physical paint sample display unit having at least two dimensions, comprising:
a first plurality of physical paint sample cards, each of the plurality of physical paint sample cards having one or more paint colors displayed thereon, the one or more colors being selected and positioned such that the first plurality of physical paint sample cards are arranged adjacent one another such that the colors thereon vary in hue in a first direction and vary in chroma in a second direction; and
one or more physical color combination paint sample cards arranged adjacent to a first selected group of said physical paint sample cards, each physical color combination paint sample card containing a plurality of paint samples, each paint sample having a respective color, one of the paint samples having a hue which is the same as a base hue of the first selected group of said physical paint sample cards, each respective physical color combination paint sample card further having a picture of a building or a room painted with each of the plurality of respective colors of each of the paint samples on that respective physical color combination paint sample card.

23. The display unit of claim 22 wherein the picture of a building or room on one of said physical color combination paint sample cards has a plurality of areas of selected size, each area painted with a respective one of the colors on the physical color combination paint sample card and wherein the respective size of each paint sample on the physical combination paint sample card varies according to the size of the area painted in the picture with the respective color.

24. The display unit of claim 22 further comprising:
a second plurality of physical paint color sample cards disposed adjacent to the first plurality of physical paint color sample cards, based on expert human input.

25. The display unit of claim 22
wherein the first plurality of physical paint sample cards are arranged in a first plurality of columns in the display unit; each column being associated with a selected hue, said first plurality of sample cards further being arranged such that a sample card having a higher chroma is positioned in each respective column above a sample card in that respective column having a lower chroma.

26. The display unit of claim 25 further comprising
a second plurality of physical paint sample cards disposed in a column adjacent said first plurality of columns based on expert human input.

27. The display unit of claim 25
wherein a third plurality of physical paint sample cards are arranged adjacent to a second selected group of the first plurality of physical paint sample cards, each of the third plurality of physical paint sample cards bearing a sample of white paint, each sample of white paint having a tint similar to that of a respective paint sample present on one of the sample cards of said second selected group.

28. The display unit of claim 27 wherein each of the sample cards in said second selected group lies in a common row.

29. The display unit of claim 27 wherein one or more physical color combination style cards are arranged adjacent to a third selected group of said paint color sample cards, each color combination style card being a tri-fold card with three separate sections, each separate section containing a plurality of paint samples of a hue the same as a base hue of the third selected group, each separate section further including a picture painted with the plurality of paint sample colors contained in that separate section.

30. The display unit of claim 22 wherein each of the first plurality of physical paint sample cards carries two or more paint colors, each said paint color having a chromatic value which is different than that of each other said paint color.

31. The display unit of claim 22 wherein one or more physical color combination style cards are arranged adjacent to a third selected group of said paint color sample cards, each color combination style card being a tri-fold card with three separate sections, each separate section containing a plurality of paint samples of a hue the same as a base hue of the third selected group, each separate section further including a picture painted with the plurality of paint sample colors contained in that separate section.

32. The display unit of claim 22 further comprising:
a third plurality of physical paint sample cards arranged adjacent to a second selected group of the first plurality of physical paint sample cards, each of the third plurality of physical paint sample cards bearing a sample of white paint, each sample of white paint having a tint similar to that of a respective paint sample present on one of the sample cards of said second selected group.

* * * * *